US 12,525,785 B2

United States Patent
Yoon et al.

(10) Patent No.: US 12,525,785 B2
(45) Date of Patent: Jan. 13, 2026

(54) PROTECTION DEVICE FOR PREVENTING REVERSE CONNECTION

(71) Applicant: LG ENERGY SOLUTION, LTD., Seoul (KR)

(72) Inventors: Sunwoo Yoon, Daejeon (KR); Suyeup Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 163 days.

(21) Appl. No.: 18/691,319

(22) PCT Filed: Sep. 27, 2022

(86) PCT No.: PCT/KR2022/014399
§ 371 (c)(1),
(2) Date: Mar. 12, 2024

(87) PCT Pub. No.: WO2023/075172
PCT Pub. Date: May 4, 2023

(65) Prior Publication Data
US 2024/0405539 A1   Dec. 5, 2024

(30) Foreign Application Priority Data
Oct. 26, 2021   (KR) .................. 10-2021-0143322

(51) Int. Cl.
*H02H 3/18*   (2006.01)

(52) U.S. Cl.
CPC .................................... *H02H 3/18* (2013.01)

(58) Field of Classification Search
CPC .......... H02H 3/18; H02H 7/18; H02H 11/002; H02J 7/00; H02J 7/0029; H02J 7/00304; H02J 7/0031; H02J 7/0034; Y10S 320/18

(Continued)

(56) References Cited

U.S. PATENT DOCUMENTS

| | | | | |
|---|---|---|---|---|
| 2001/0038520 A1* | 11/2001 | Yagi | ................ | G01N 23/223 |
| | | | | 361/246 |
| 2015/0295397 A1* | 10/2015 | Lin | ................ | E04H 4/0006 |
| | | | | 4/491 |
| 2015/0372475 A1* | 12/2015 | Wu | ................ | H02H 3/162 |
| | | | | 361/42 |

FOREIGN PATENT DOCUMENTS

| CN | 105449742 A   * | 3/2016 | ............ H02J 7/0063 |
|---|---|---|---|
| CN | 108462163 B | 9/2019 | |

(Continued)

OTHER PUBLICATIONS

Machine translation of Abe et al. Japanese Patent Document JP 2002-118958 A Apr. 2002 (Year: 2002).*

(Continued)

*Primary Examiner* — Kevin J Comber
(74) *Attorney, Agent, or Firm* — Birch, Stewart, Kolasch & Birch, LLP

(57) ABSTRACT

A protection device of an electronic device can include a first switch having an input terminal, a first output terminal connected to a first node, and a second output terminal connected to a second node; and a second switch having an input terminal, a first output terminal connected to a third node, and a second output terminal connected to a fourth node. In a first relay, a relay switch is connected between the first node and a positive input terminal of the electronic device, and an input terminal of a first driver is connected to the first node. In a second relay, a relay switch is connected between a negative input terminal of the electronic device and the third node, and a second driver includes an input terminal connected to an output terminal of the first driver and an output terminal connected to the third node.

18 Claims, 6 Drawing Sheets

(58) Field of Classification Search
USPC .......................................................... 361/84
See application file for complete search history.

(56) References Cited

FOREIGN PATENT DOCUMENTS

| | | | | |
|---|---|---|---|---|
| JP | 4-156226 | A | | 5/1992 |
| JP | 2000-138023 | A | | 5/2000 |
| JP | 2001-349853 | A | | 12/2001 |
| JP | 2007-14165 | A | | 1/2007 |
| JP | 2007014165 | A | * | 1/2007 |
| JP | 2007-82374 | A | | 3/2007 |
| JP | 2008-301591 | A | | 12/2008 |
| JP | 3171998 | U | | 12/2011 |
| JP | 6083923 | B2 | | 2/2017 |
| JP | 2002118958 | A | * | 4/2022 |
| KR | 10-2018-0099161 | A | | 9/2018 |
| KR | 10-2020-0034372 | A | | 3/2020 |
| KR | 10-2021-0048851 | A | | 5/2021 |
| WO | WO 2015/111692 | A1 | | 7/2015 |

OTHER PUBLICATIONS

Machine translation of Takezoe Japanese Patent Document JP 2007-14165 A Jan. 2007 (Year: 2007).*
Machine translation of Chinese Patent Document CN 105449742 Mar. 2016 (Year: 2016).*
International Search Report (PCT/ISA/210) issued in PCT/KR2022/014399 mailed on Jan. 2, 2023.
Extended European Search Report for European Application No. 22887376.6, dated Dec. 10, 2024.

* cited by examiner

[Figure 1]
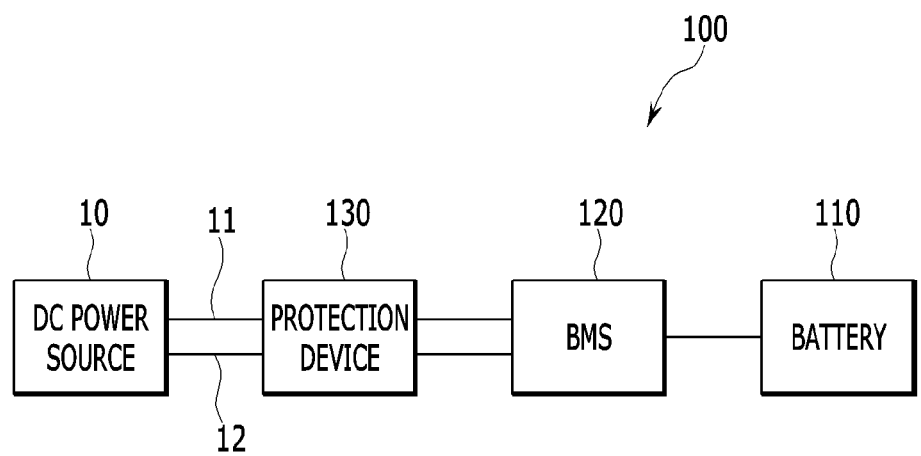

[Figure 2]
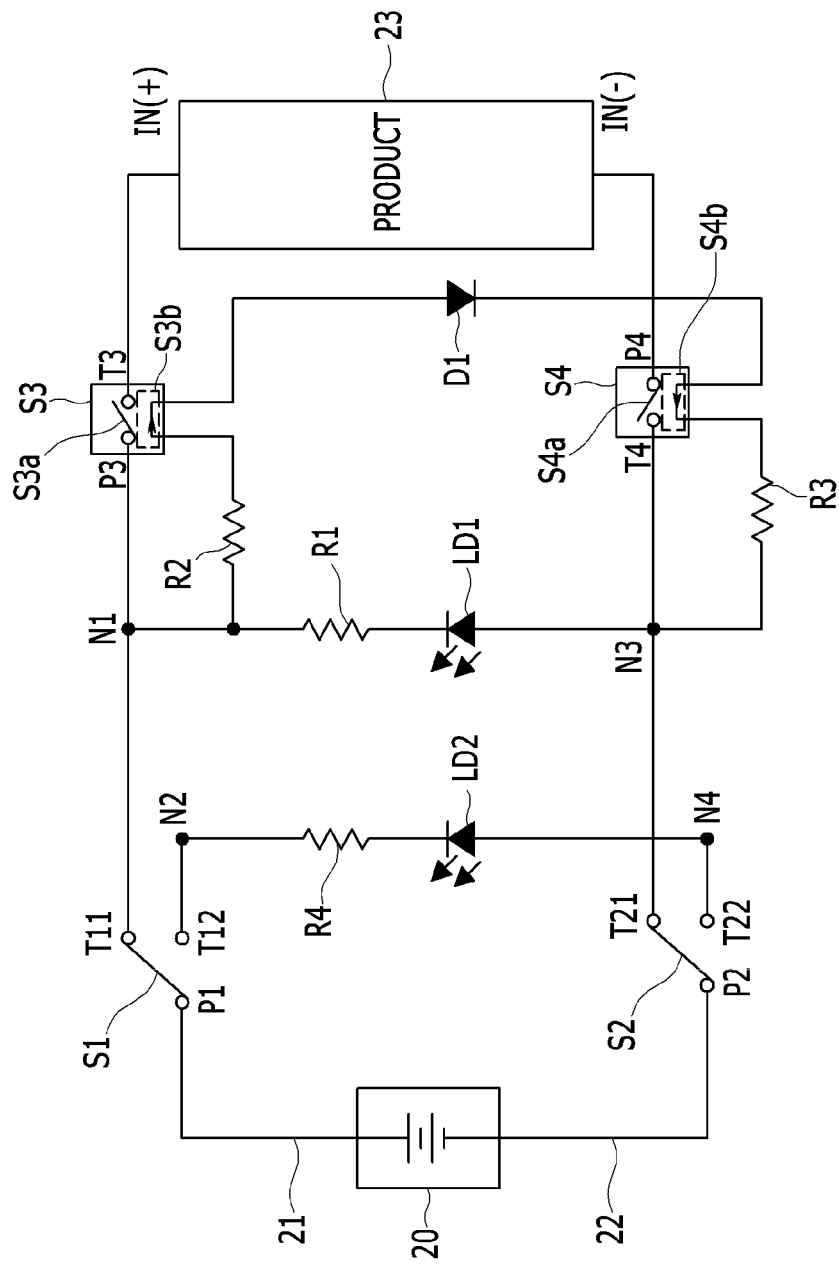

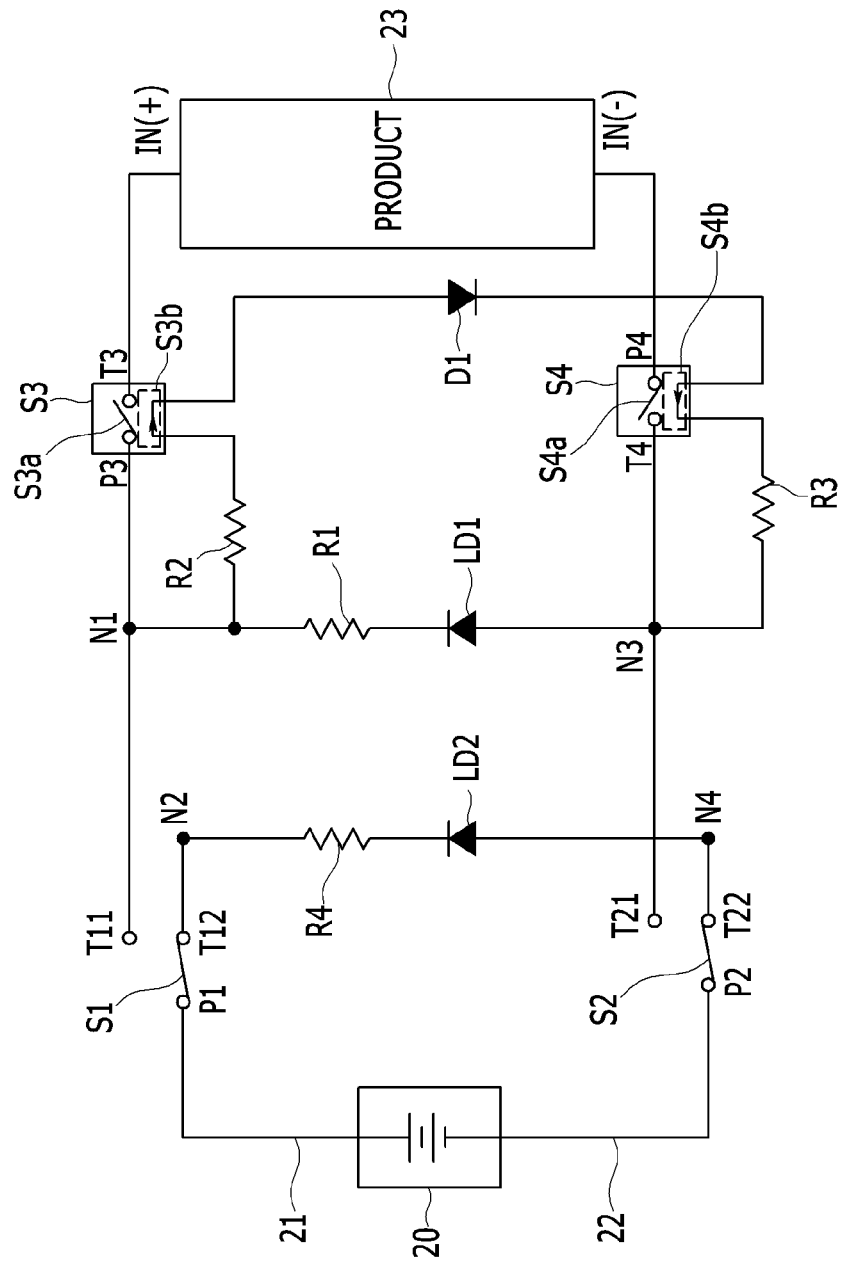
[Figure 3]

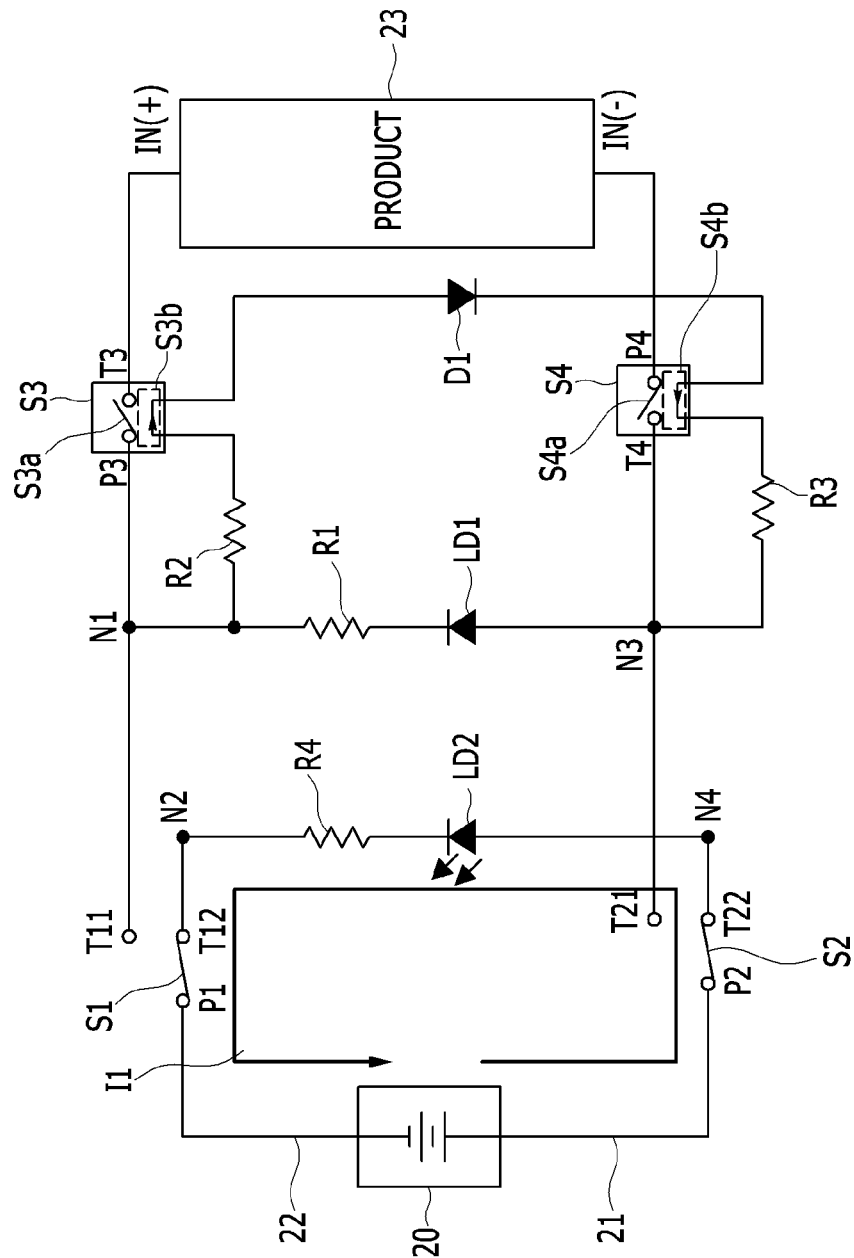
[Figure 4]

[Figure 5]
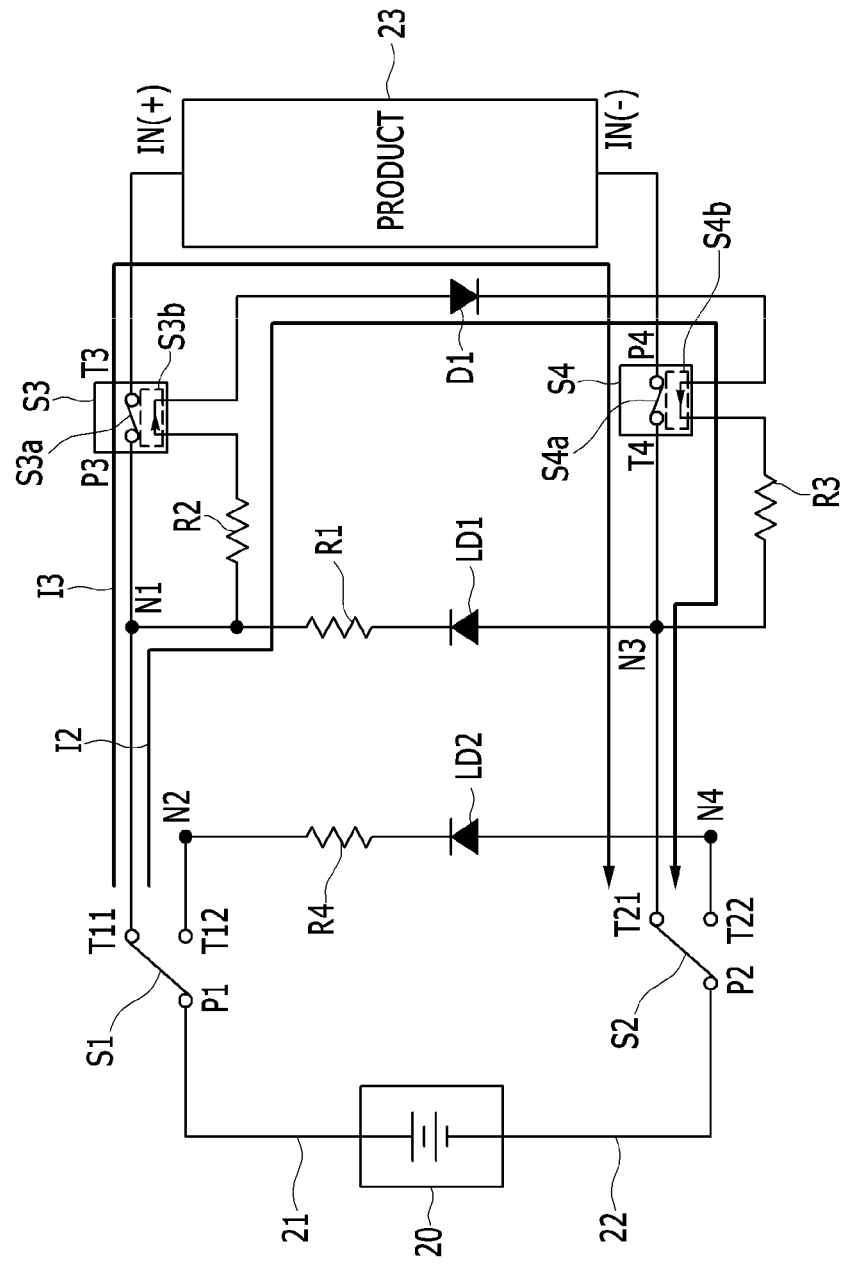

[Figure 6]
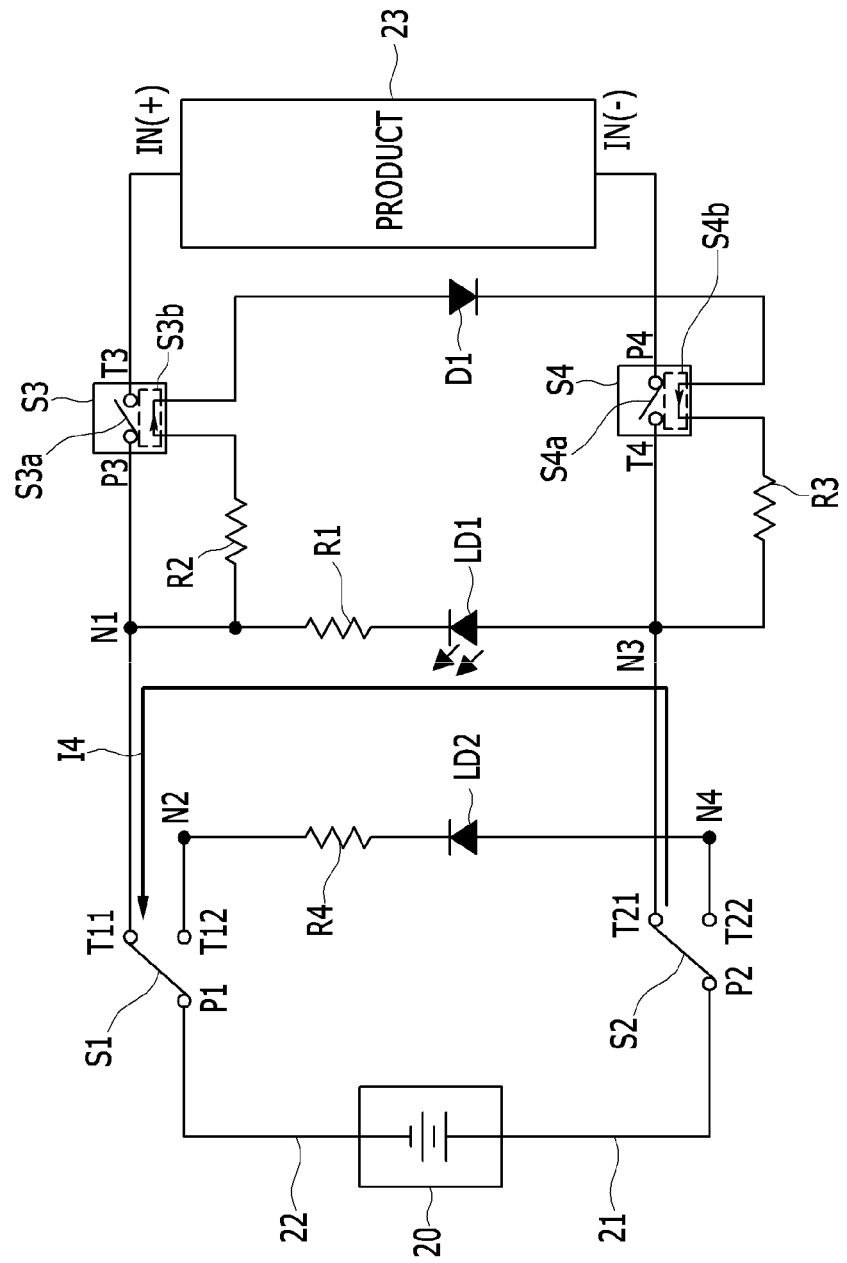

PROTECTION DEVICE FOR PREVENTING REVERSE CONNECTION

CROSS-REFERENCE TO RELATED APPLICATION

This application claims priority to and the benefit of Korean Patent Application No. 10-2021-0143322 filed in the Korean Intellectual Property Office on Oct. 26, 2021, the entire contents of which are incorporated herein by reference.

The disclosure relates to a protection device for preventing reverse connection.

BACKGROUND ART

An energy storage system (ESS) that stores power and provides the stored power is being used in various fields. For example, the ESS may be used to store power overproduced in a power plant and provide the power when a temporary power shortage occurs. The ESS may be manufactured in a small size to be used in buildings, factories, homes, etc. in case of a power failure or for peak power reduction. In addition, the ESS may be used to store power produced using new renewable energy and use the stored power in a desired time zone.

A rechargeable battery is used for the ESS. The rechargeable battery may be used as an energy source of various types of external devices such as an electronic device and a moving means, as well as the ESS.

An electronic device, such as a battery management system, is used for protection or management of a battery, together with the battery. A direct-current (DC) voltage is applied to operate the electronic device. To this end, in general, a power source that applies a DC voltage is connected to a power input terminal of the electronic device. However, when the power source is connected to the power input terminal of the electronic device, a reverse connection causing a positive terminal of the power source to be connected to a negative terminal of the power input terminal may occur. In this case, a reverse voltage may be applied to the electronic device, thus causing a malfunction of the electronic device.

DISCLOSURE

Technical Problem

The present invention has been made in an effort to provide a protection device having advantages of preventing reverse connection of a direct-current (DC) power source.

Technical Solution

An exemplary embodiment of the present invention provides a protection device of an electronic device to which power is supplied from a direct-current power source that includes a positive wiring and a negative wiring. The protection device includes a first switch, a second switch, a first relay, and a second relay. The first switch includes an input terminal to which the positive wiring or the negative wiring is connected, a first output terminal connected to a first node, and a second output terminal connected to a second node. The second switch includes an input terminal to which the positive wiring or the negative wiring is connected, a first output terminal connected to a third node, and a second output terminal connected to a fourth node. The first relay includes a first relay switch and a first driver. The first relay switch includes a first terminal connected to the first node and a second terminal connected to a positive input terminal of the electronic device. The first driver is configured to drive the first relay switch, and includes an input terminal connected to the first node. The second relay includes a second relay switch and a second driver. The second relay switch includes a first terminal connected to a negative input terminal of the electronic device and a second terminal connected to the third node. The second driver is configured to drive the second relay switch, and includes an input terminal connected to an output terminal of the first driver and an output terminal connected to the third node.

According to an embodiment of the present invention, the protection device may further include a diode configured to block current flowing from the third node to the first node through the second driver and the first driver.

According to an embodiment of the present invention, the protection device may further include an indication element connected between the first node and the third node and configured to perform an indication operation when current flows from the third node to the first node.

According to an embodiment of the present invention, the indication element may include a light-emitting diode configured to emit light when current flows from the third node to the first node.

According to an embodiment of the present invention, the protection device may further include an indication element connected between the second node and the fourth node and configured to perform an indication operation when current flows from the fourth node to the second node.

According to an embodiment of the present invention, the indication element may include a light-emitting diode configured to emit light when current flows from the fourth node to the second node.

According to an embodiment of the present invention, the electronic device may be configured to manage a battery.

Another embodiment of the present invention provides a protection device of an electronic device to which power is supplied from a direct-current power source that includes a positive wiring and a negative wiring. The protection device includes a first switch, a second switch, a first relay, a second relay, and an indication element. The first switch includes an input terminal to which the positive wiring or the negative wiring is connected, a first output terminal connected to a first node, and a second output terminal connected to a second node. The second switch includes an input terminal to which the positive wiring or the negative wiring is connected, a first output terminal connected to a third node, and a second output terminal connected to a fourth node. The first relay is connected between the first node and a positive input terminal of the electronic device. The second relay is connected between the third node and a negative input terminal of the electronic device. The indication element is connected between the second node and the fourth node, and configured to perform an indication operation when the negative wiring is connected to the input terminal of the first switch and the positive wiring is connected to the input terminal of the second switch in a state in which the first switch is switched to the second output terminal and the second switch is switched to the second output terminal.

According to an embodiment of the present invention, the indication element may include a light-emitting diode configured to emit light when current flows from the fourth node to the second node.

According to an embodiment of the present invention, the first relay and the second relay may be turned on when the positive wiring is connected to the input terminal of the first switch and the negative wiring is connected to the input terminal of the second switch in a state in which the first switch is switched to the first output terminal thereof and the second switch is switched to the first output terminal thereof.

According to an embodiment of the present invention, the first relay and the second relay may be turned off when the negative wiring is connected to the input terminal of the first switch and the positive wiring is connected to the input terminal of the second switch in a state in which the first switch is switched to the first output terminal thereof and the second switch is switched to the first output terminal thereof.

According to an embodiment of the present invention, the electronic device may be configured to manage a battery.

Yet another embodiment of the present invention provides a protection device of an electronic device to which power is supplied from a direct-current power source that includes a positive wiring and a negative wiring. The protection device includes a first switch, a second switch, a first relay, a second relay, and an indication element. The first switch includes an input terminal to which the positive wiring or the negative wiring is connected, a first output terminal connected to a first node, and a second output terminal connected to a second node. The second switch includes an input terminal to which the positive wiring or the negative wiring is connected, a first output terminal connected to a third node, and a second output terminal connected to a fourth node. The first relay is connected between the first node and a positive input terminal of the electronic device. The second relay is connected between the third node and a negative input terminal of the electronic device. The indication element is connected between the first node and the third node, and configured to perform an indication operation when the negative wiring is connected to the input terminal of the first switch and the positive wiring is connected to the input terminal of the second switch in a state in which the first switch is switched to the first output terminal thereof and the second switch is switched to the first output terminal thereof.

According to an embodiment of the present invention, the indication element may include a light-emitting diode configured to emit light when current flows from the third node to the first node.

According to an embodiment of the present invention, the first relay and the second relay may be turned on when the positive wiring is connected to the input terminal of the first switch and the negative wiring is connected to the input terminal of the second switch in a state in which the first switch is switched to the first output terminal and the second switch is switched to the first output terminal.

According to an embodiment of the present invention, the first relay and the second relay may be turned off when the negative wiring is connected to the input terminal of the first switch and the positive wiring is connected to the input terminal of the second switch in a state in which the first switch is switched to the first output terminal and the second switch is switched to the first output terminal.

According to an embodiment of the present invention, the first relay and the second relay may be turned off in a state in which the first switch is switched to the second output terminal and the second switch is switched to the second output terminal.

According to an embodiment of the present invention, the electronic device may be configured to manage a battery.

Advantageous Effect

According to an embodiment of the present invention, it is possible to prevent a reverse connection between an electronic device used for battery management and a direct-current power source.

DESCRIPTION OF THE DRAWINGS

FIG. 1 is a diagram illustrating an example of a battery device according to an exemplary embodiment.

FIG. 2 is a diagram illustrating an example of a protection device according to an exemplary embodiment.

FIGS. 3 and 5 are diagrams illustrating examples of an operation of a protection device in a forward connection state according to an exemplary embodiment.

FIGS. 4 and 6 are diagrams illustrating examples of an operation of a protection device in a reverse connection state according to an exemplary embodiment.

MODE FOR INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that when a component is referred to as being "connected to" another component, the component may be connected to the other component directly but another component may be interposed therebetween. In contrast, it will be understood that when a component is referred to as being "directly connected" to another component, no component is interposed therebetween.

In the following description, singular forms are intended to include plural form as well, unless explicit expressions such as "one" or "single" are used.

In a flowchart described with reference to the drawings, an order of operations may be changed, several operations may be merged, an operation may be divided into sub-operations, and an operation may be omitted.

FIG. 1 is a diagram illustrating an example of a battery device according to an exemplary embodiment.

Referring to FIG. 1, a battery device 100 includes a battery 110, a battery management system (BMS) 120, and a protection device 130.

The battery 110 is a rechargeable secondary battery. For example, the battery 110 may be a lithium battery, such as a lithium ion battery or a lithium ion polymer battery, or a nickel battery, such as a nickel-cadmium (NiCd) battery or a nickel hydrogen (NiMH) battery. In an embodiment, the battery 110 may be a single battery cell, a battery module in which an assembly of multiple battery cells or multiple assemblies of batteries are connected in series or parallel, a battery pack (or battery rack) in which multiple battery modules are connected in series or parallel, or a device in which multiple battery packs (battery racks) are connected in series or parallel.

The battery management system 120 is an electronic device that manages the battery 110, and protects the battery 110 or monitors information of or a state of the battery 110. The battery management system 120 may be referred to as a battery protection unit (BPU). The battery management system 120 operates by receiving a direct current (DC) voltage from a DC power source 10.

The DC power source 10 includes a positive terminal and a negative terminal, a positive wiring 11 is connected to the positive terminal, and a negative wiring 12 is connected to the negative terminal. The DC power source 10 may supply power through the positive wiring 11 and the negative wiring 12.

In an embodiment, the battery device 100 may be an energy management system. In this case, the DC power source 10 may include a power converter, e.g., a switching mode power supply (SMPS), which converts power from an external alternating current (AC) power source into a DC voltage.

The protection device 130 is connected between the DC power source 10 and a power input terminal of the battery management system 120. The protection device 130 performs a protection function to connect the positive wiring 11 of the DC power source 10 to a positive input terminal of the battery management system 120 and the negative wiring 12 of the DC power source 10 to a negative input terminal of the battery management system 120. In an embodiment, the protection device 130 may disconnect the DC power source 10 and the power input terminal of the battery management system 120 from each other when the positive wiring 11 of the DC power source 10 is connected to the negative input terminal of the battery management system 120. In an embodiment, the protection device 130 may transmit power from the DC power source 10 to the battery management system 120, when the positive wiring 11 of the DC power source 10 is connected to the positive input terminal of the battery management system 120 and the negative wiring 12 of the DC power source 10 is connected to the negative input terminal of the battery management system 120.

FIG. 2 is a diagram illustrating an example of a protection device according to an exemplary embodiment.

Referring to FIG. 2, the protection device includes switches S1, S2, S3, and S4.

The switch S1 includes an input terminal P1 and first and second output terminals T11 and T12, and the switch S2 includes an input terminal P2 and first and second output terminals T21 and T22. The input terminals P1 and P2 of the switches S1 and S2 correspond to input terminals of the protection device. In an embodiment, each of the switches S1 and S2 may be a single pole double throw (SPDT) switch. In an embodiment, the two switches S1 and S2 may be formed as one double pole double throw (DPDT) switch. In an embodiment, the switch S1 may connect the input terminal P1 and the first output terminal T11 when turned on, and connect the input terminal P1 and the second output terminal T12 when turned off. The switch S2 may connect the input terminal P2 and the first output terminal T21 when turned on, and connect the input terminal P2 and the second output terminal T22 when turned off. The second output terminal T12 of the switch S1 is connected to one node (e.g., a "second node") N2, and the second output terminal T22 of the switch S2 is connected to another node (e.g., a "fourth node") N4. That is, the second output terminal T12 of the switch S1 and the second output terminal T22 of the switch S2 are connected to each other.

The switch S3 includes an input terminal (or "first terminal") P3 and an output terminal (or "second terminal") T3, and the switch S4 includes an input terminal (or "first terminal") P4 and an output terminal (or "second terminal") T4. In an embodiment, each of the switches S3 and S4 may be a relay. The switches S3 and S4 will be hereinafter referred to as relays. The relay S3 includes a relay switch S3a and a relay driver S3b, and the relay switch S3a may be turned on when current flows through the relay driver S3b. The relay S4 includes a relay switch S4a and a relay driver S4b, and the relay switch S4a may be turned on when current flows through the relay driver S4b. In an embodiment, the relay drivers S3b and S4b may be light-emitting diodes (LEDs), and the relay switches S3a and S4a may be metal oxide semiconductor field-effect transistors (MOSFETs). In an embodiment, the relays S3 and S4 may be, for example, photo-MOS relays.

The input terminal P1 of the switch S1 and the input terminal P2 of the switch S2 are connected to a positive wiring 21 and a negative wiring 22 of a DC power source 20, respectively. The first output terminal T11 of the switch S1 is connected to one node (or "first node") N1, and the input terminal (or "first terminal") P3 of the relay switch S3a is connected to the node N1. The first output terminal T21 of the switch S2 is connected to another node (or "third node") N3, and an output terminal (or "second terminal") of the relay switch S4a is connected to the node N3. Accordingly, the first output terminal T11 of the switch S1 is connected to the input terminal P3 of the relay switch S3a, and the first output terminal T21 of the switch S2 is connected to the output terminal T4 of the relay switch S4a. The output terminal (or "second terminal") T3 of the relay switch S3a and the input terminal (or "first terminal") P4 of the relay switch S4a are connected to a product 23 to which power is supplied from the DC power source 20. In an embodiment, the product 23 may include an electronic device such as a battery management system (e.g., the battery management system 120 of FIG. 1). In this case, the output terminal T3 of the relay switch S3a is connected to a positive input terminal IN(+) of the product 23, and the input terminal P4 of the relay switch S4a is connected to a negative input terminal IN(−) of the product 23. Therefore, the DC power source 20 may be connected to the protection device in a forward direction, when the positive wiring 21 of the DC power source 20 is connected to the input terminal P1 of the switch S1 and the negative wiring 22 of the DC power source 20 is connected to the input terminal P2 of the switch S2.

An input terminal (or "first terminal") of the relay driver S3b is connected to the node N1, an output terminal (or "second terminal") of the relay driver S3b is connected to an input terminal (or "first terminal") of the relay driver S4b, and an output terminal (or "second terminal") of the relay driver S4b is connected to the node N3. Accordingly, the input terminal of the relay driver S3b is connected to the first output terminal T11 of the switch S1, and the output terminal of the relay driver S4b is connected to the first output terminal T21 of the switch S2.

In an embodiment, a diode D1 may be formed between the nodes N1 and N3 to prevent reverse current from flowing in a path formed by the relay drivers S3b and S4b. The diode D1 may allow current to flow from the node N1 to the node N3 through the relay drivers S3b and S4b, and prevent current from flowing from the node N3 to the node N1 through the relay drivers S3b and S4b. For example, an anode of the diode D1 may be connected to the output terminal of the relay driver S3b, and a cathode of the diode D1 may be connected to the input terminal of the relay driver S4b. In an embodiment, resistors R2 and R3 may be formed in a path between the nodes N1 and N3 formed through the relay drivers S3b and S4b.

In an embodiment, an indication element LD1 may be connected between the nodes N1 and N3. In an embodiment, a resistor R1 may be further connected between the nodes N1 and N3. For example, the resistor R1 and the indication element LD1 may be connected in series between the nodes N1 and N3. The indication element LD1 may perform an indication operation when current flows from the node N3 to the node N1. In an embodiment, the indication element LD1 may be a light-emitting diode that emits light to perform the indication operation when current flows therethrough. For example, the cathode of the light-emitting diode LD1 may be connected to the node N1 and the anode of the light-emitting diode LD1 may be connected to the node N3.

In an embodiment, an indication element LD2 may be connected between the nodes N2 and N4. In an embodiment, a resistor R4 may be further connected between the nodes N2 and N4. For example, the resistor R4 and the indication element LD2 may be connected in series between the nodes N2 and N2. The indication element LD2 may perform the indication operation when a current flows from the node N4 to the node N2. In an embodiment, the indication element LD2 may be a light-emitting diode that emits light to perform the indication operation when current flows therethrough. For example, a cathode of the light-emitting diode LD2 may be connected to the node N2 and an anode of the light-emitting diode LD2 may be connected to the node N4.

Next, a protection operation of the protection device of FIG. 2 will be described with reference to FIGS. 3 to 6 below.

FIGS. 3 and 5 are diagrams illustrating examples of an operation of a protection device in a forward connection state according to exemplary embodiments. FIGS. 4 and 6 are diagrams illustrating examples of an operation of a protection device in a reverse connection state according to exemplary embodiments.

Referring to FIGS. 3 and 4, a DC power source 20 may be connected to an input terminal of the protection device, i.e., input terminals P1 and P2 of switches S1 and S2, in a state in which the switches S1 and S2 are turned off. That is, the DC power source 20 may be connected to the input terminals P1 and P2 of the switches S1 and S2 in a state in which the switch S1 is switched to a second output terminal T12 (or a node N2) and the switch S2 is switched to a second output terminal T22 (or a node N4). When the switches S1 and S2 are turned off, relays S3 and S4 are in a turned-off state because current is not supplied to relay drivers S3b and S4b.

As illustrated in FIG. 3, when the DC power source 20 is connected in a forward direction, a positive wiring 21 of the DC power source 20 is connected to the input terminal P1 of the switch S1 and a negative wiring 22 of the DC power source 20 is connected to the input terminal P2 of the switch S2. In this case, current does not flow through an indication element LD2 and thus an indication element LD2 does not perform the indication operation. For example, the indication element, e.g., a light-emitting diode, LD2 does not emit light.

As illustrated in FIG. 4, when the DC power source 20 is connected in a reverse direction, the negative wiring 22 of the DC power source 20 is connected to the input terminal P1 of the switch S1 and the positive wiring 21 of the DC power source 20 is connected to the input terminal P2 of the switch S2. In this case, current I1 flows from the node N4 to the node N2 through the indication element LD2 due to the DC power source 20 connected in the reverse direction. Because the current I1 flows through the indication element LD2, the indication element LD2 performs an indication operation. For example, the current I1 flows through the indication element (e.g., a light emitting diode) LD2 and thus the indication element LD2 emits light.

As described above, whether the DC power source 20 is connected to the protection device in the forward direction or the reverse direction may be identified according to whether the indication element LD2 performs the indication operation. When the indication element LD2 indicates a reverse connection, a user may connect the DC power source 20 to the protection device in the forward direction by connecting the wirings 21 and 22 to the protection device in an opposite direction.

Referring to FIGS. 5 and 6, a DC power source 20 may be connected to the input terminal of the protection device, i.e., the input terminals P1 and P2 of the switches S1 and S2, in a state in which the switches S1 and S2 are turned on. That is, the DC power source 20 may be connected to the input terminals P1 and P2 of the switches S1 and S2 in a state in which the switch S1 is switched to a first output terminal (or a node N1) and the switch S2 is switched to a second output terminal (or a node N3).

As illustrated in FIG. 5, when the DC power source 20 is connected in the forward direction, the positive wiring 21 of the DC power source 20 is connected to the input terminal P1 of the switch S1 and the negative wiring 22 of the DC power source 20 is connected to the input terminal P2 of the switch S2. Then, current I2 flows from the node N1 to the node N3 through a resistor R2, a relay driver S3b, a diode D1, a relay driver S4b, and a resistor R3. The relay drivers S3b and S4b are driven by the current I2 to turn on the relay switches S3a and S4a, i.e., the relays S3 and S4. Accordingly, power I3 may be supplied normally to the product 23 from the DC power source 20 through the switch S1, the relay S3, the relay S4, and the switch S2.

As illustrated in FIG. 6, when the DC power source 20 is connected in the reverse direction, the negative wiring 22 of the DC power source 20 is connected to the input terminal P1 of the switch S1 and the positive wiring 21 of the DC power source 20 is connected to the input terminal P2 of the switch S2. In this case, a current path from the node N1 to the node N3 is blocked by the diode D1 through the relay drivers S3b and S4b. Because current is not supplied to the relay drivers S3b and S4b, the relay drivers S3b and S4b are not driven and thus the relay switches S3a and S4a, i.e., the relays S3 and S4, are maintained 'off'. Accordingly, the protection device may block a reverse voltage of the DC power source 20 from being applied to the product 23.

Meanwhile, current I4 flows from the node N3 to the node N1 through the indication element LD1 due to the DC power source 20 connected in the reverse direction. Because the current I3 flows through the indication element LD1, the indication element LD1 performs the indication operation. For example, the current I3 flows through the indication element (e.g., a light emitting diode) LD1 and thus the indication element LD1 emits light.

As described above, whether the DC power source 20 is connected to the protection device in the forward direction or the reverse direction may be identified according to whether the indication element LD1 performs the indication operation. When the indication element LD2 indicates a reverse connection, a user may connect the DC power source 20 to the protection device in the forward direction by connecting the wirings 21 and 22 to the protection device in an opposite direction. In addition, when the DC power source 20 is connected to the protection device in the reverse direction, power from the DC power source 20 may be blocked from being supplied to the product 23.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A protection device of an electronic device to which power is supplied from a direct-current power source that includes a positive wiring and a negative wiring, the protection device comprising:
   a first switch including:
      an input terminal to which the positive wiring or the negative wiring is connected;
      a first output terminal connected to a first node; and
      a second output terminal connected to a second node;
   a second switch including:
      an input terminal to which the positive wiring or the negative wiring is connected;
      a first output terminal connected to a third node; and
      a second output terminal connected to a fourth node;
   a first relay including a first relay switch and a first driver, the first relay switch including a first terminal connected to the first node and a second terminal connected to a positive input terminal of the electronic device, and the first driver being configured to drive the first relay switch and including an input terminal connected to the first node; and
   a second relay including a second relay switch and a second driver, the second relay switch including a first terminal connected to a negative input terminal of the electronic device and a second terminal connected to the third node, and the second driver being configured to drive the second relay switch and including an input terminal connected to an output terminal of the first driver and an output terminal connected to the third node.

2. The protection device of claim 1, further comprising:
   a diode configured to block current flowing from the third node to the first node through the second driver and the first driver.

3. The protection device of claim 1, further comprising:
   an indication element connected between the first node and the third node and configured to perform an indication operation when current flows from the third node to the first node.

4. The protection device of claim 3, wherein
   the indication element comprises a light-emitting diode configured to emit light when current flows from the third node to the first node.

5. The protection device of claim 1, further comprising:
   an indication element connected between the second node and the fourth node and configured to perform an indication operation when current flows from the fourth node to the second node.

6. The protection device of claim 5, wherein
   the indication element comprises a light-emitting diode configured to emit light when current flows from the fourth node to the second node.

7. The protection device of claim 1, wherein
   the electronic device is configured to manage a battery.

8. A protection device of an electronic device to which power is supplied from a direct-current power source that includes a positive wiring and a negative wiring, the protection device comprising:
   a first switch including:
      an input terminal to which the positive wiring or the negative wiring is connected;
      a first output terminal connected to a first node; and
      a second output terminal connected to a second node;
   a second switch including:
      an input terminal to which the positive wiring or the negative wiring is connected;
      a first output terminal connected to a third node; and
      a second output terminal connected to a fourth node;
   a first relay connected between the first node and a positive input terminal of the electronic device;
   a second relay connected between the third node and a negative input terminal of the electronic device; and
   an indication element connected between the second node and the fourth node, the indication element being configured to perform an indication operation when the negative wiring is connected to the input terminal of the first switch and the positive wiring is connected to the input terminal of the second switch in a state in which the first switch is switched to the second output terminal and the second switch is switched to the second output terminal.

9. The protection device of claim 8, wherein
   the indication element comprises a light-emitting diode configured to emit light when current flows from the fourth node to the second node.

10. The protection device of claim 8, wherein
   the first relay and the second relay are turned on when the positive wiring is connected to the input terminal of the first switch and the negative wiring is connected to the input terminal of the second switch in a state in which the first switch is switched to the first output terminal and the second switch is switched to the first output terminal.

11. The protection device of claim 8, wherein
   the first relay and the second relay are turned off when the negative wiring is connected to the input terminal of the first switch and the positive wiring is connected to the input terminal of the second switch in a state in which the first switch is switched to the first output terminal and the second switch is switched to the first output terminal.

12. The protection device of claim 8, wherein
   the electronic device is configured to manage a battery.

13. A protection device of an electronic device to which power is supplied from a direct-current power source that includes a positive wiring and a negative wiring, the protection device comprising:
   a first switch including:
      an input terminal to which the positive wiring or the negative wiring is connected;
      a first output terminal connected to a first node; and
      a second output terminal connected to a second node;
   a second switch including:
      an input terminal to which the positive wiring or the negative wiring is connected;
      a first output terminal connected to a third node; and
      a second output terminal connected to a fourth node;
   a first relay connected between the first node and a positive input terminal of the electronic device;
   a second relay connected between the third node and a negative input terminal of the electronic device; and
   an indication element connected between the first node and the third node, the indication element being configured to perform an indication operation when the negative wiring is connected to the input terminal of the first switch and the positive wiring is connected to the input terminal of the second switch in a state in which the first switch is switched to the first output terminal thereof and the second switch is switched to the first output terminal thereof.

14. The protection device of claim 13, wherein the indication element comprises a light-emitting diode configured to emit light when current flows from the third node to the first node.

15. The protection device of claim 13, wherein the first relay and the second relay are turned on when the positive wiring is connected to the input terminal of the first switch and the negative wiring is connected to the input terminal of the second switch in a state in which the first switch is switched to the first output terminal and the second switch is switched to the first output terminal.

16. The protection device of claim 13, wherein the first relay and the second relay are turned off when the negative wiring is connected to the input terminal of the first switch and the positive wiring is connected to the input terminal of the second switch in a state in which the first switch is switched to the first output terminal and the second switch is switched to the first output terminal.

17. The protection device of claim 13, wherein the first relay and the second relay are turned off in a state in which the first switch is switched to the second output terminal and the second switch is switched to the second output terminal.

18. The protection device of claim 13, wherein the electronic device is configured to manage a battery.

* * * * *